J. C. BOHMKER.
TRACTOR.
APPLICATION FILED FEB. 28, 1917.

1,256,651.

Patented Feb. 19, 1918.
3 SHEETS—SHEET 3.

Witness:
Harry S. Gaither

Inventor:
John C. Bohmker
By Miller Chindall & Parker
Attys

UNITED STATES PATENT OFFICE.

JOHN C. BOHMKER, OF BRADLEY, ILLINOIS, ASSIGNOR TO SEARS, ROEBUCK AND COMPANY, OF CHICAGO, ILLINOIS, A CORPORATION OF NEW YORK.

TRACTOR.

1,256,651.    Specification of Letters Patent.    Patented Feb. 19, 1918.

Application filed February 23, 1917. Serial No. 151,438.

*To all whom it may concern:*

Be it known that I, JOHN C. BOHMKER, a citizen of the United States, residing at Bradley, in the county of Kankakee and State of Illinois, have invented certain new and useful Improvements in Tractors, of which the following is a specification.

This invention relates to motor-driven vehicles intended for propelling or drawing other vehicles or implements, as, for example, the tractors used for drawing agricultural implements. As ordinarily constructed, such tractors are caused to travel by means of power applied to the wheels of the tractor. In order that the wheels shall exert sufficient traction against the ground, it is necessary that the vehicle shall be of considerable weight, and as a result tractors of the common type pack the soil to an objectionable extent, particularly if the ground is soft.

The object of this invention is the provision, in the tractor, of propelling mechanism which shall exert a direct pushing action against the ground instead of being dependent upon the friction between the driving wheels and the ground, as in prior types of tractors. One of the advantages attained by the invention is that the ground is not packed to any material extent by the tractor, since the latter may be of lighter construction than has heretofore been possible. A more direct and positive application of the power also is obtained.

Figure 1:
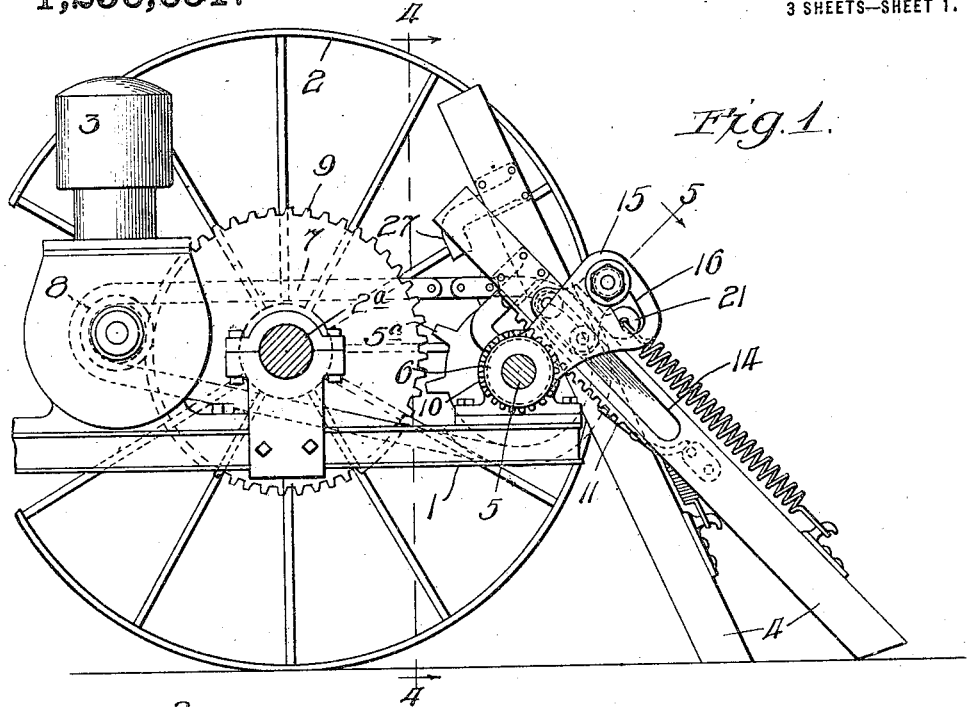
Figure 2:
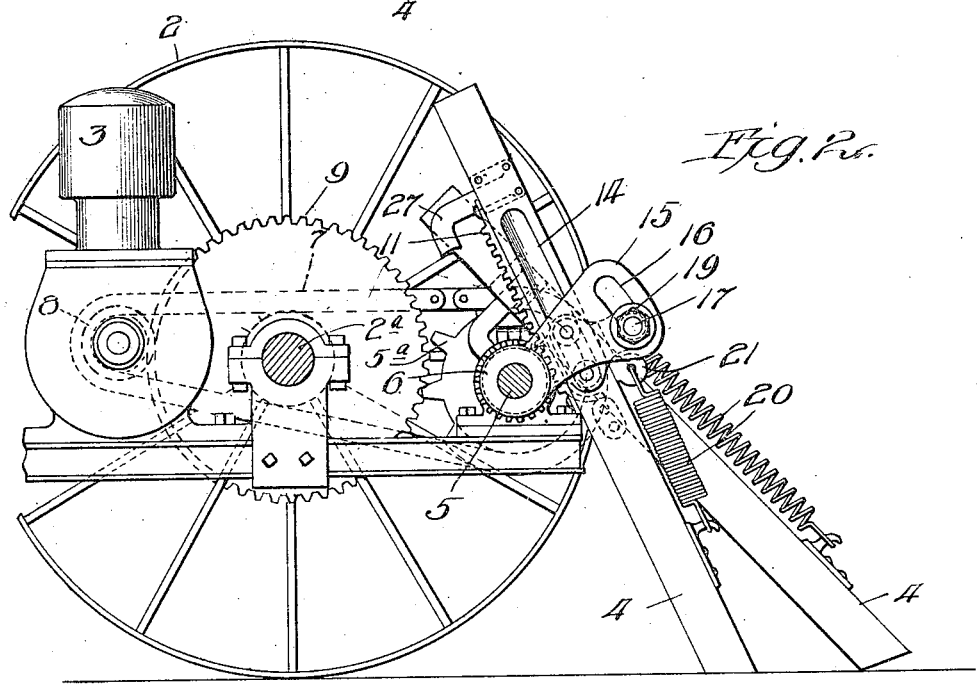
Figure 3:
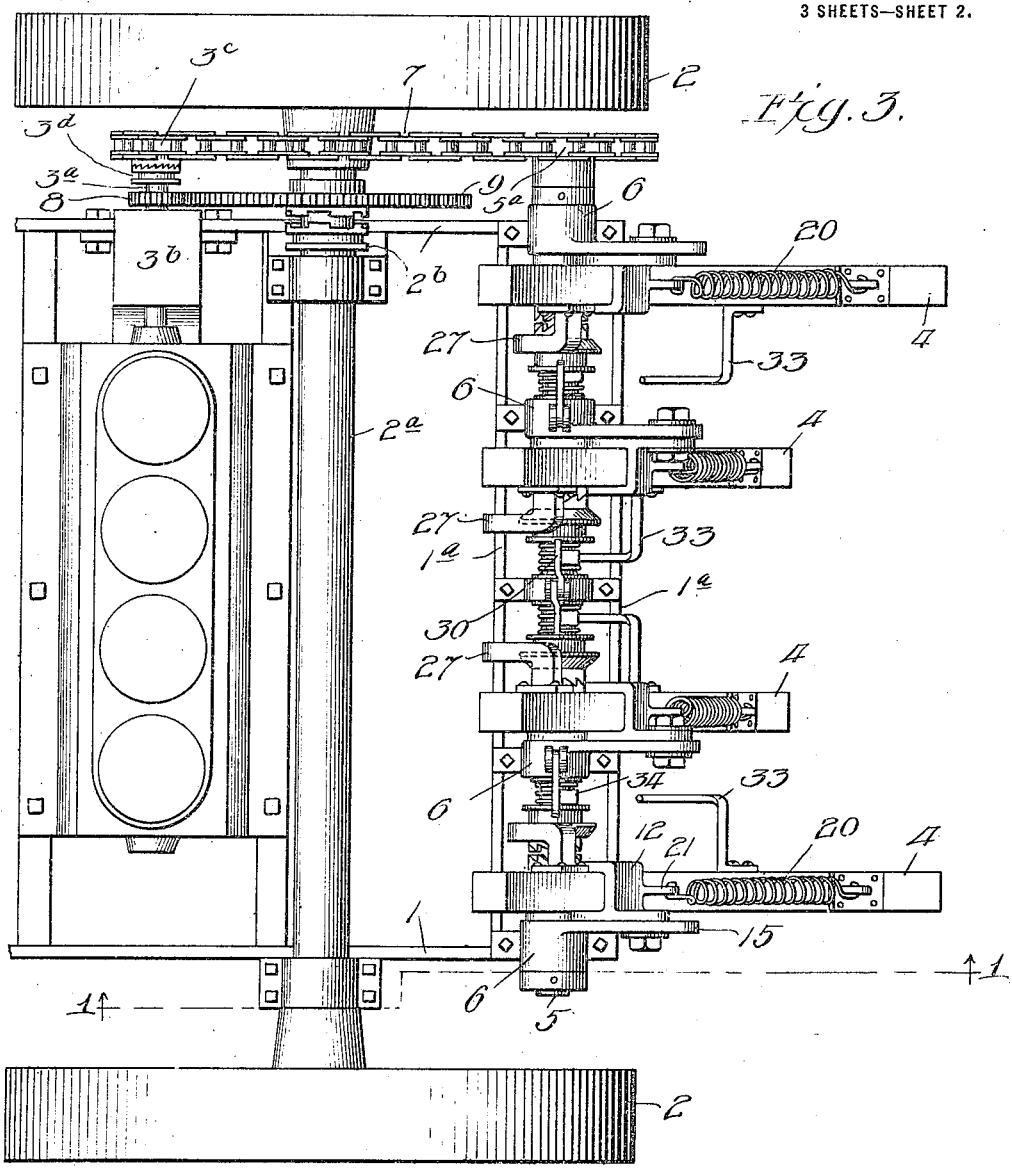
Figure 4:
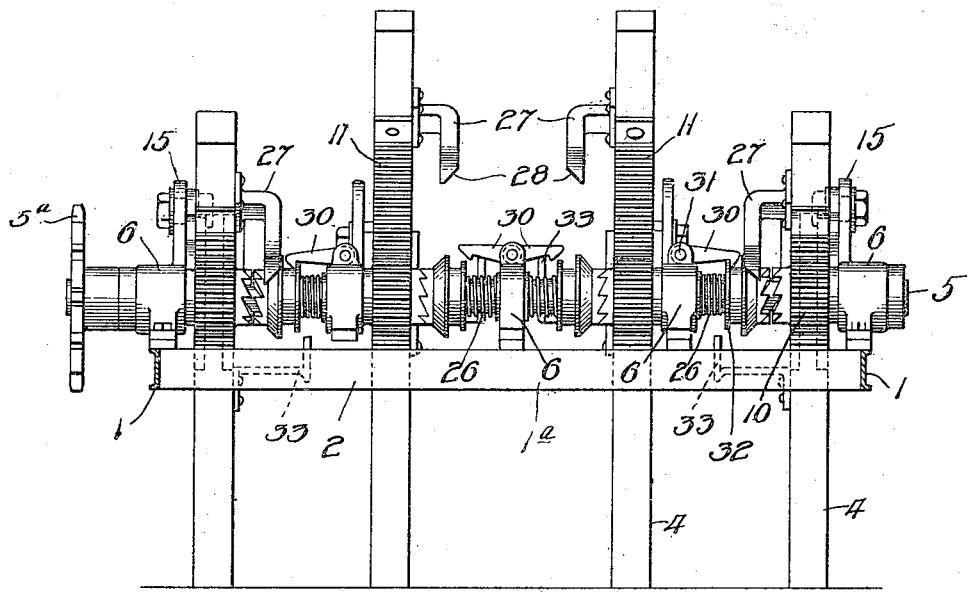
Figure 5:
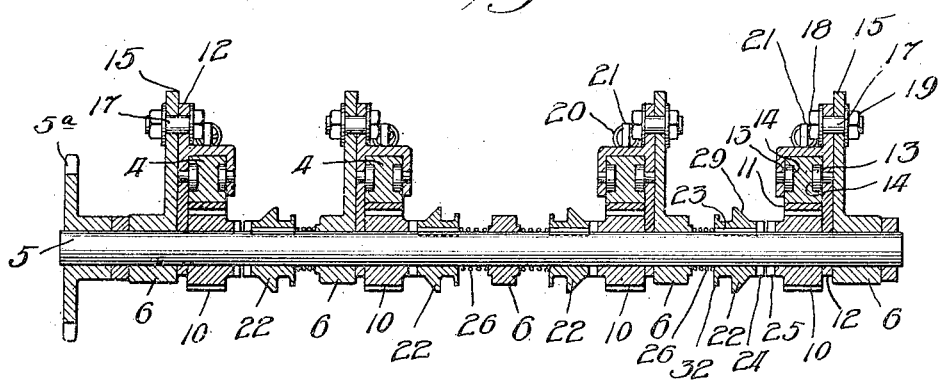

In the accompanying drawings, Figure 1 is a longitudinal vertical sectional view of a tractor embodying the features of my invention, the view being taken in the plane of dotted line 1 of Fig. 3. Fig. 2 is similar to Fig. 1 but illustrates a different position of the parts. Fig. 3 is a fragmental top plan view of the tractor. Fig. 4 is a sectional view taken in the plane of dotted line 4—4 of Fig. 1. Fig. 5 is a section on line 5 of Fig. 1.

The framework of the tractor may be of any suitable construction. The portion of the framework herein shown comprises two longitudinal sills or beams 1 and two transverse bars 1ª. The frame of the tractor may be supported upon wheels of any suitable type and arrangement. The rear end of the framework is herein represented as supported upon two wheels 2 fixed upon an axle 2ª. The motive power may be of any desired character. Herein is illustrated an internal combustion engine 3, it being understood that an internal combustion engine of any preferred type may be employed. The engine may be mounted upon the frame of the tractor in any suitable position and location.

The propelling mechanism herein disclosed comprises four pusher bars 4 arranged to be longitudinally moved in a downward and rearward direction by means of rack and pinion mechanism and to be moved in the opposite direction by means of tension springs. The pinions are mounted upon a shaft 5 which extends transversely of the tractor frame and is rotatably mounted in bearings 6 secured to the longitudinal beams 1 and the transverse bars 1ª. Power may be communicated from the engine 3 to the shaft 5 in any suitable manner. Herein is shown a shaft 3ª driven from the engine 3 through a transmission indicated diagrammatically at 3ᵇ. On the shaft 3ª is a sprocket wheel 3ᶜ arranged to be connected to the shaft 3ª by means of a clutch member 3ᵈ. A sprocket chain 7 extends from the wheel 3ᶜ to a wheel 5ª fixed on the shaft 5.

The rack and pinion mechanism hereinbefore mentioned are substantially identical in construction. Each comprises a pinion 10 which is loose or rotatable upon the shaft 5. The pinion meshes at all times with a rack 11 fixed to the adjacent pusher bar 4. The rack 11 is maintained in proper meshing relation with the pinion 10 during the swinging movements of the pusher bar by means including a bracket 12 pivotally mounted upon the shaft 5 and provided with two pairs of antifriction rollers 13. Each pair of rollers 13 lies within a groove 14 extending longitudinally of one side of the pusher bar 4. It will be seen that the bracket 12 with its rollers 13 prevents the part of the pusher bar which is near the pinion from moving radially toward or away from the pinion and thus prevents the rack teeth from moving down into the space between the pinion teeth and from moving out of said space. As will be apparent from a comparison of Figs. 1 and 2, the bracket 12 swings upon the axis of the shaft 5 as the pusher bar reciprocates.

To guide the swinging bracket 12 and prevent twisting or displacement thereof, I provide a bracket plate or web 15 fixed to the adjacent bearing 6, said bracket having in its outer end a slot 16 which is curved upon the arc of a circle concentric with the shaft 5. Through this slot passes a bolt 17 which extends through the bracket 12. The bracket 12 is held in sliding contact with the bracket 15 by the head 18 and nut 19 of said bolt, washers being placed in contact with the head and nut as shown in Fig. 5.

A tension spring 20 is connected at one end in a suitable manner to the lower portion of the pusher bar 4, the other end of the spring being connected to an eye 21 upon the bracket 12.

The means for causing the pinion 10 to rotate with the constantly-driven shaft 5 comprises a clutch member 22 which is slidable longitudinally of the shaft but is connected to rotate therewith by means of a spline 23. The clutch member 22 has ratchet clutch teeth 24 which are adapted to engage similar teeth 25 upon the hub of the pinion 10. An expansion spring 26 located between the slidable clutch member 22 and the adjacent bearing 6 tends to slide the clutch member into engagement with the hub of the pinion 10.

Any suitable means may be provided for disengaging the clutch member 22 from the pinion 10 at the end of the downward and rearward movement of the pusher bar 4. The means herein shown for this purpose comprises a bracket 27 fixed to the upper portion of the pusher bar 4 and having an inclined face 28 upon its lower end, which face is arranged to engage a tapered annular surface 29 upon the clutch member and thus crowd the clutch member 22 away from the pinion 10.

Any preferred means may be employed to hold the clutch member 22 in the withdrawn position. In this embodiment of the invention I have illustrated a hook 30 pivoted at 31 to the adjacent bearing 6, said hook being adapted to engage an annular flange 32 upon the clutch member 22 when the latter is forced aside by the bracket 27.

Devices of any preferred character may be provided to disengage the hook 30 from the clutch member 32 upon the completion of the upward and forward or return movement of the pusher bar. Herein is shown a bracket 33 secured to the pusher bar at a point below the pinion, the end of which bracket is arranged to engage beneath a lug 34 on the hook 30 to lift the hook away from the flange 32.

In operation, as soon as the clutch member 22 is disengaged from the pinion 10, the spring 20 pulls the pusher bar forward and up to the position occupied by the pusher bar which is nearest to the observer in Fig. 2. As the pusher bar approaches the end of its upward movement, the bracket 33 engages the lug 34 and thus withdraws the hook 30 from the clutch member 32. The latter is immediately moved by the spring 26 into engagement with the pinion 10, thereby causing the pinion 10 to rotate in the direction to move the pusher bar 4 downwardly and rearwardly against the tension of the spring 20. As the pusher bar 4 nears the end of its downward and rearward movement the bracket 27 engages the clutch member 22 and forces the clutch member away from the pinion 10 and into engagement with the hook 30. This cycle of operations is repeated so long as the shaft 5 is driven.

In the present embodiment four pusher bars are provided, the two outer bars moving in unison in the same direction, and the two inner bars moving in unison in a direction opposite to that taken by the two outer pusher bars, the lower ends of the bars (which may be of any suitable form and size) bear against the ground and thus push the tractor forward. The pusher bars are capable of swinging to the extent determined by the length of the slots 16, to accommodate themselves to the travel of the tractor and to inequalities of the surface over which the tractor is moving.

Any suitable means may be provided whereby the power of the engine may, at will, be applied to the wheels 2 for moving the tractor forward or backward. Herein is shown a pinion 8 fixed on the shaft $3^a$ and meshing with a spur gear 9 loose on the axle $2^a$. $2^b$ is a clutch member for connecting the gear 9 to the axle. It will be evident that, if desired, the wheels 2 may be driven to coöperate with the pushing mechanism in advancing the tractor, that the wheels alone may be used to advance the tractor, and that the wheels may be employed to back the machine.

It will be understood that the invention is not limited to the construction, arrangement and operation herein described, except as indicated in the appended claims.

I claim as my invention:

1. A propelling mechanism having, in combination a pushing element, a rack attached to and extending longitudinally of the pushing element, a pinion meshing with the rack, a shaft on which the pinion is mounted, a bracket pivoted on the axis of the shaft, the pushing element having a longitudinal groove, the walls of which are engaged by said bracket to maintain the rack in proper relation to the pinion, a spring strained between the pushing element and said bracket, a stationary plate located alongside the bracket and having a slot curved upon the arc of a circle concentric with the shaft, a member fixed to the bracket and extending slidably through said slot, a spring-pressed clutch member for connecting the pinion to the shaft, a detent for holding the clutch member in inoperative position, and devices on the pushing element at opposite sides of the clutch member for alternately disengaging the clutch member and the detent.

2. A propelling mechanism having, in combination, a pushing element, a rack attached to and extending longitudinally of the pushing element, a pinion meshing with the rack, a shaft on which the pinion is mounted, a bracket pivoted on the axis of the shaft, the pushing element having a longitudinal groove, the walls of which are engaged by said bracket to maintain the rack in proper relation to the pinion, a stationary plate located alongside the bracket and having a slot curved upon the arc of a circle concentric with the shaft, a member fixed to the bracket and extending slidably through said slot, a spring-pressed clutch member for connecting the pinion to the shaft, a detent for holding the clutch member in inoperative position, devices on the pushing element at opposite sides of the clutch member for alternately disengaging the clutch member and the detent, and means for moving the pushing element in the direction opposite to the direction of movement produced by the pinion.

3. A propelling mechanism having, in combination, a pushing element, a rack attached to and extending longitudinally of the pushing element, a pinion meshing with the rack, a shaft on which the pinion is mounted, a bracket pivoted on the axis of the shaft, the pushing element having a longitudinal groove, the walls of which are engaged by said bracket to maintain the rack in proper relation to the pinion, a clutch member for connecting the pinion to the shaft, and devices on the pushing element for controlling the clutch member.

4. A propelling mechanism having, in combination, a pushing element, a rack on the pushing element, a pinion meshing with the rack, a shaft on which the pinion is mounted, a bracket pivoted on the axis of the shaft, said bracket slidably engaging the pushing element and holding the same at a definite distance from the pinion, a tension spring strained between the pushing element and said bracket, and means for connecting and disconnecting the pinion and the shaft.

5. A propelling mechanism having, in combination, a pushing element, a rack on the pushing element. a pinion meshing with the rack, a shaft on which the pinion is mounted, a bracket pivoted on the axis of the shaft, said bracket slidably engaging the pushing element and holding the same at a definite distance from the pinion, means for moving the pushing element in one direction, and means for connecting and disconnecting the pinion and the shaft.

6. A propelling mechanism having, in combination, a pushing element supported for sliding and swinging movement, a rack on the pushing element, a pinion meshing with the rack, a shaft on which the pinion is mounted, a spring for moving the pushing element in one direction, and means for connecting and disconnecting the pinion and the shaft.

7. A propelling mechanism having, in combination, a shaft, a pinion, a clutch member on the shaft for connecting the shaft and the pinion, a rack on the pushing element, said rack being in constant engagement with the pinion, a member on the pushing element for disconnecting the clutch member from the pinion, a device to hold the clutch member in withdrawn position, a member on the pushing element for disengaging the holding device from the clutch member, and a spring for moving the pushing element when the clutch member is disengaged from the pinion.

8. A propelling mechanism having, in combination, a shaft, a pinion, a clutch member on the shaft for connecting the shaft and the pinion, a rack on the pushing element, said rack being in constant engagement with the pinion, means for disconnecting the clutch member from the pinion, a device to hold the clutch member in withdrawn position, means for disengaging the holding device from the clutch member, and a spring for moving the pushing element when the clutch member is disengaged from the pinion.

9. A propelling mechanism having, in combination, a pushing element, a shaft, a pinion, a clutch member on the shaft for connecting the shaft and the pinion, a rack on the pushing element, said rack being in constant engagement with the pinion, means for connecting the clutch member and the pinion, means for disengaging the clutch member from the pinion, and a spring for moving the pushing element when the clutch member is disengaged from the pinion.

10. A propelling mechanism having, in combination, a pushing element, means for moving said element in one direction including a pinion, means for driving the pinion, means for connecting and disconnecting the pinion and its driving means, and means for moving the pushing element in the direction opposite to the direction of movement produced by the pinion.

11. A propelling mechanism having, in combination, a pushing element, a rack operatively connected to said element. a pinion arranged to mesh with said rack, a shaft for driving the pinion, means for connecting and disconnecting the pinion and the shaft, ad means for moving the pushing element in the direction opposite to the direction of movement produced by the pinion.

12. A propelling mechanism having, in combination, a pushing element, a shaft, means for supporting the pushing element for reciprocatory movement and for swinging movement on the axle of the shaft, a rack and a pinion for moving said element in one direction, the pinion being mounted on the shaft and the rack on the pushing element, a spring for returning the element, and means for controlling the operation of the rack and pinion.

13. A propelling mechanism having, in combination, a pushing element, a rack and pinion mechanism for moving said element in one direction, a spring for returning the element, and means for controlling the rack and pinion mechanism.

14. A propelling mechanism having, in combination, a pushing element, gearing mechanism for moving said element in one direction, means for moving the element in the opposite direction, means for imparting a swinging motion to said pushing element as it reciprocates, and means for limiting the length of the reciprocations of the element.

15. A tractor having, in combination, a pushing element, a shaft having a drive wheel thereon, power means for rotating said shaft to actuate said wheel, said shaft having a gearing connection with said pushing element adapted to move said element in one direction, and means for moving said element in the opposite direction.

In testimony whereof, I have hereunto set my hand.

JOHN C. BOHMKER.

Copies of this patent may be obtained for five cents each, by addressing the "Commissioner of Patents, Washington, D. C."